United States Patent
Zhuo et al.

(10) Patent No.: US 7,115,317 B2
(45) Date of Patent: *Oct. 3, 2006

(54) FLEXIBLE NON-METALLIC SEALS MADE OF NON-WOVEN FABRIC WITH INSERTS

(75) Inventors: Zhangqing Zhuo, Clifton Park, NY (US); Wei Tong, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 10/677,339

(22) Filed: Oct. 3, 2003

(65) Prior Publication Data

US 2005/0074582 A1   Apr. 7, 2005

(51) Int. Cl.
*B32B 3/20* (2006.01)
*B32B 3/12* (2006.01)
*B32B 3/02* (2006.01)
*F16J 15/08* (2006.01)
*F16J 15/10* (2006.01)

(52) U.S. Cl. ............. 428/174; 428/178; 428/188; 428/116; 428/118; 428/66.4; 277/654; 277/644; 277/645; 277/650; 277/906; 277/355

(58) Field of Classification Search ........ 428/174, 428/178, 188, 116, 118, 66.4; 277/654, 644, 277/645, 650, 906, 355

See application file for complete search history.

(56) References Cited

U.S. PATENT DOCUMENTS

| | | | |
|---|---|---|---|
| 1,457,763 A | 6/1923 | Adams | |
| 1,582,562 A | 4/1926 | Vogel | |
| 1,601,381 A | 9/1926 | Thompson | |
| 1,946,475 A | 2/1934 | Barker | |
| 3,275,331 A | 9/1966 | Mastrobattista et al. | |
| 3,938,813 A | 2/1976 | Forch | |
| 3,965,942 A * | 6/1976 | Hatch | 139/384 R |
| 4,618,152 A | 10/1986 | Campbell | |
| 4,955,218 A | 9/1990 | Brandener | |
| 5,161,806 A | 11/1992 | Balsells | |
| 5,286,574 A | 2/1994 | Foster | |
| 5,438,906 A | 8/1995 | Huber | |
| 5,549,968 A | 8/1996 | Byers et al. | |
| 6,254,106 B1 | 7/2001 | Denker et al. | |
| 6,619,669 B1 | 9/2003 | Zhuo et al. | |

FOREIGN PATENT DOCUMENTS

| | | |
|---|---|---|
| DE | 32 23 676 A1 | 1/1984 |
| EP | 0 903 518 A2 | 3/1999 |
| JP | 3-213337 | 9/1991 |

* cited by examiner

*Primary Examiner*—Harold Pyon
*Assistant Examiner*—Catherine A. Simone
(74) *Attorney, Agent, or Firm*—Nixon & Vanderhye, P.C.

(57) ABSTRACT

A seal has a non-woven fabric folded along lines transverse to the opposite side of the seal and secured by adhesive to fabric strips. The non-woven fabric forms elongated cells with a plurality of the cells receiving inserts to increase seal stiffness. By securing one of these strips to a stationary component of the sealing surfaces, the opposite strip may expand or collapse relative to a movable sealing surface to accommodate excursions of that surface. Multiple layers of cells may be provided in the seals. The inserts may have various cross-sectional configurations including circular, triangular or rhombic and formed of tubes, solid rods or coiled springs.

16 Claims, 6 Drawing Sheets

FLEXIBLE NON-METALLIC SEALS MADE OF NON-WOVEN FABRIC WITH INSERTS

BACKGROUND OF THE INVENTION

The present invention relates generally to seals and particularly to fabric seals for usage in low leakage static or dynamic sealing applications.

The increased worldwide demand for electricity leads to the necessity of designing large-scale, high-powered, high-efficiency, and low cost power generation turbomachines with high standards for reliability and performance. One of the primary concerns in a turbomachine design is its sealing performance because it has direct impact on machine operating reliability and efficiency. A number of seals are used in turbomachines such as gas/steam turbines, compressors, and generators for minimizing leakage flows. According to the movement of a seal relative to its sealing surface, seals can be classified as stationary seals affording leakage barriers around and between stationary components or rotating seals affording leakage barriers between stationary and rotating components. Over the years, various techniques have been developed to improve both stationary and rotating seals. Much of this development has occurred in the turbine industry where parasitic flow control is critical.

As a circumferential contacting seal, brush seals have been widely used in turbomachines due to their distinguishing characteristics, i.e., lower leakage flow rate compared with labyrinth seals and seal flexibility for accommodating excursions at the interface without excessive wear and loss of sealing capability. However, brush seals formed of brush bristles are usually expensive and have exhibited hysterisis and were difficult to manufacture. The crucial seal parameters such as cant angle and bristle height depend on the process capability or manufacturing technique and are very difficult to control. A conventional brush seal is made by either folding bristles over a metal plate or sandwiching bristles between a pair of ring-shaped metal support plates and welding ends of the bristles and plates to one another adjacent common edges thereof. Since the metal bristle holder is usually machined with a tight tolerance, a brush seal can fit only a specific sealing dimension. This can result in very high costs for brush seals in tooling, manufacturing, and installation and leads to a long cycle time in brush seal fabrication.

BRIEF SUMMARY OF THE INVENTION

According to a preferred embodiment of the present invention, there is provided an insert loaded flexible seal formed of a fabric, preferably a non-woven fabric, disposed between a pair of strips, preferably also formed of a fabric material. Preferably, a continuous non-woven fabric layer is folded onto itself and is secured, for example, by adhesive along the fold lines to itself or to the strips to form a plurality of cells extending longitudinally between opposite sides of the seal. Consequently, the cells lie between the pair of fabric strips and the seal responds substantially freely to forces acting on the seal. That is, generally rectilinear, triangular or rhombic cells which are collapsible and expandable in a direction between the two sealing surfaces are provided, the cells having dimensions varying from hundreds of micrometers to several centimeters.

In a particular application of the present invention, one of the strips may, for example, be adhered by adhesive to a stationary component, i.e., a stator surface. The other strip is located adjacent the rotating surface. Because the non-woven fabric forming the cells lies between the strips, the seal responds substantially freely to applied forces. Thus, any radial excursion of the rotating surface is accommodated by the collapsing and expansion of the cells of the seal. The strip in contact with the rotating surface may have a wear-resistance material applied to its surface. For example, a coating of Teflon or a near frictionless carbon coating can be applied to that strip.

As will be appreciated, the seals can be formed of one or more layers of cells with inserts in the cells. The thickness of the seal can thus be varied depending upon the sealing application. For example, for certain applications, the fabric layers may be formed of a mixture of metallic and non-metallic fibers enabling the seal for use in intermediate to high pressure applications. Various other design parameters may be altered depending upon the application such as fabric construction, material, fabric layer thickness, type and form of inserts, cell construction and dimensions. One particular advantage of the present seal is that in contrast to brush seals having bristles which are laid at certain angles to the shaft surface to facilitate seal flexibility and avoid excessive fiber stress during shaft excursion, the present seal is independent of the direction of rotation of the shaft. The risk of seal damage due to reverse rotation is thus eliminated. Secondly, seal flexibility is adjustable. For example, seal flexibility may be increased by increasing the cell size and/or the number of cell layers, as compared with a less flexible seal with decreased cell size and/or cell layers. For applications which require substantial seal stiffness, as in the preferred embodiment hereof, inserts are placed in the seal cells. Such inserts may take numerous types, forms and sizes. For example, thin walled pipes formed of rubber or plastic, such as aerated plastic sticks, solid rods of like material, or wire coils. According to the particular cell shape, these inserts can have different cross-sectional shapes, e.g., round, triangular and rhombic. In addition, the insert material can be either non-metallic or metallic. For sealing hydrogen gas, e.g., in hydrogen-cooled generators, non-metallic materials are used for safety considerations.

A third immediate advantage of the present seal is that it provides solutions for applications having large sealing dimensions and/or irregular sealing geometry. Conventional seals require machining brush holders precisely with tight tolerances. As a result, each seal can serve only a specific sealing dimension. As a sealing dimension becomes large, it becomes very difficult to make the seal. The present seal can readily and easily fit different sealing dimensions and complex sealing geometry.

In a preferred embodiment according to the present invention, there is provided a seal between first and second spaced components comprising first and second fabric layers spaced from one another with a first layer thereof for securement to the first component and a second layer thereof disposed adjacent the second component, a third fabric secured to and between the first and second layers, the third fabric defining a plurality of cells between the first and second layers having major length dimensions extending in directions generally coextensive with the layers of the seal, the third fabric biasing the second layer in a direction towards the second component and inserts extending within a plurality of the cells to provide stiffness to the seal.

In a further preferred embodiment according to the present invention, there is provided a seal between first and second spaced components comprising first and second fabric layers spaced from one another with a first layer thereof for securement to the first component and a second layer thereof disposed adjacent the second component, a third fabric secured to and between the first and second layers, the third fabric defining a plurality of cells between the first and second layers having major length dimensions extending in directions generally coextensive with the layers of the seal, the fabric cells having elongated multiple sides between the layers and inserts extending within a plurality of the cells to provide stiffness to the seal, the inserts being substantially coextensive in length with the length of the cells.

DETAILED DESCRIPTION OF THE INVENTION

Figure 1:
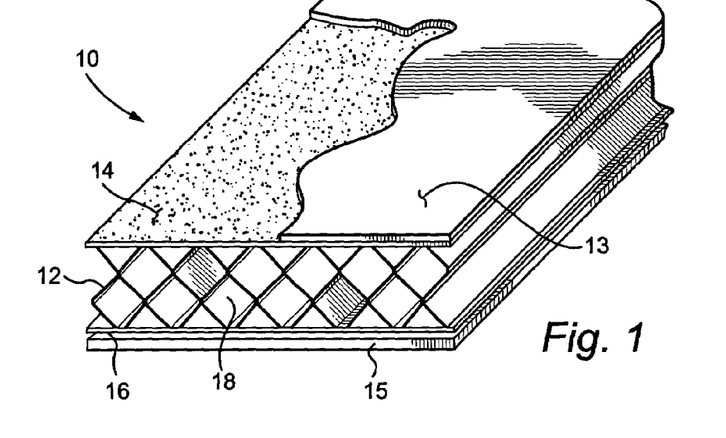
FIG. 1 is a perspective view of a fabric seal construction illustrated without the inserts of the insert loaded seal hereof.
Figure 2:
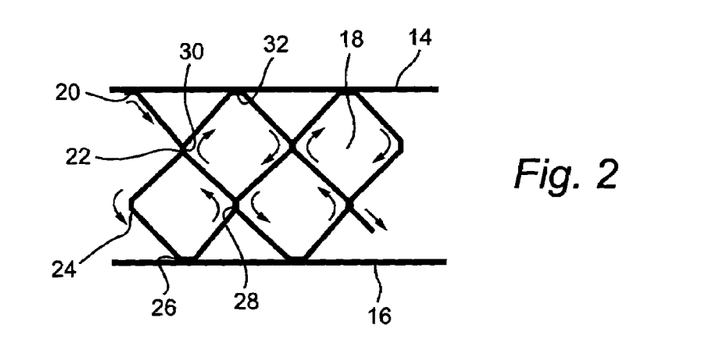
FIG. 2 is an enlarged fragmentary cross-sectional view of the seal of FIG. 1 illustrating its fabric construction.
Figure 3:
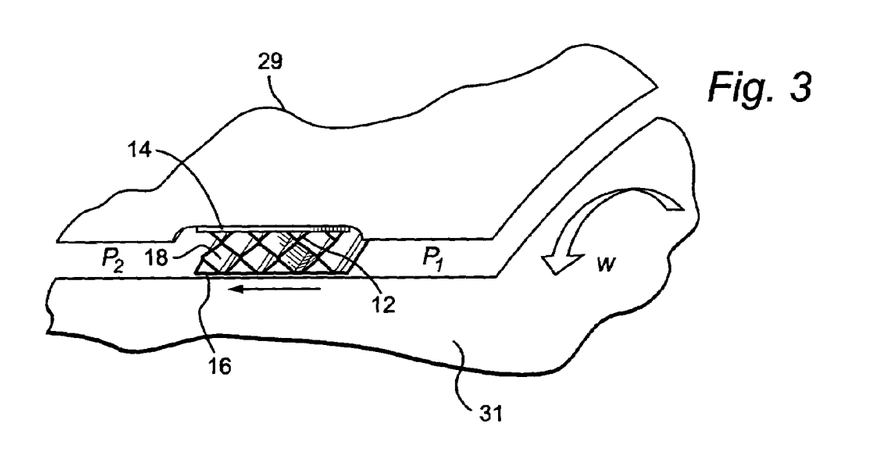
FIG. 3 is a perspective view of the fabric seal located between stationary and rotary components.

Referring now to the drawings, particularly to FIGS. 1, 2, there is illustrated a seal constructed in accordance with the preferred embodiment of the present invention and generally designated 10. The seal 10 includes a seal body 12 formed of a non-woven fabric material sandwiched between a pair of strips 14 and 16. The seal is for disposition between a pair of components, e.g., first and second stationary components 13 and 15, i.e., a stationary seal, or a stationary component and a rotatable component, i.e., a dynamic seal (see FIG. 3). In FIG. 1, the strips 14 and 16 are preferably formed of a non-woven fabric material and form a stationary seal. Thus, strips 14 and 16 may be secured to the stationary components 13 and 15, respectively, for example, by an adhesive. In the case of a dynamic seal as illustrated in FIG. 3, strip 14 may be secured to a stationary part 29 and strip 16 may lie closely adjacent to or in engagement with a rotary component 31. The seal 10 thus seals between the two components.

Preferably, the fabric body 12 is formed of a single continuous non-woven fabric folded at spaced locations relative to one another and adhered at the fold lines, e.g., by an adhesive, to form a multiplicity of cells 18. For example, and referring to FIG. 2, the non-woven fabric 12 may be secured along an edge 20 by an adhesive to the fabric 14 and have alternating folds 22 and 24 between strips 14 and 16 until the strip is folded along fold line 26 and adhered to strip 16. The continuous non-woven fabric layer 12 may then reverse direction and extends to strip 14. Layer 12 thus has alternating folds forming fold lines 28 and 30 until it is secured, preferably by adhesive, to the first fabric 14 along a fold line 32. The non-woven fabric 12 continues from one side of the seal, i.e., one pressure region, to the opposite side of the seal, i.e., the other pressure region, with similar alternate folds between the material strips 14 and 16 forming the cells 18. The fold lines of fabric 12 intermediate strips 14 and 16 are adhered, e.g., by adhesive, to one another. For example, fold lines 22 and 30 are adhered to one another. Thus, the cells and fold lines extend longitudinally about the seal in and on opposite sides of the seal. That is, the cells 18 extend longitudinally about the seal and together with the fabric 12, lie between high and low pressure regions on opposite sides of the seal. Seal 10 can be formed in a flat configuration or may be irregular in shape or circular, for example, as illustrated in FIG. 3.

In FIG. 3, a seal similar to the seal disclosed in FIGS. 1 and 2 is disposed between a stationary component and a rotating component. The multi-cell seal formed by the non-woven fabric 12 is adhered as in the prior embodiment to strips of preferably non-woven fabric material 14 and 16. The fabric material 14 is adhered to a stationary component 29, for example by an adhesive. The fabric material 16 lies directly adjacent and is engagable with the rotating surface of the rotating component 31. It will be appreciated that the seal 12 in FIG. 3 may expand or collapse in response to rotary excursions of the rotatable component while maintaining the integrity of the seal.

Figure 4:
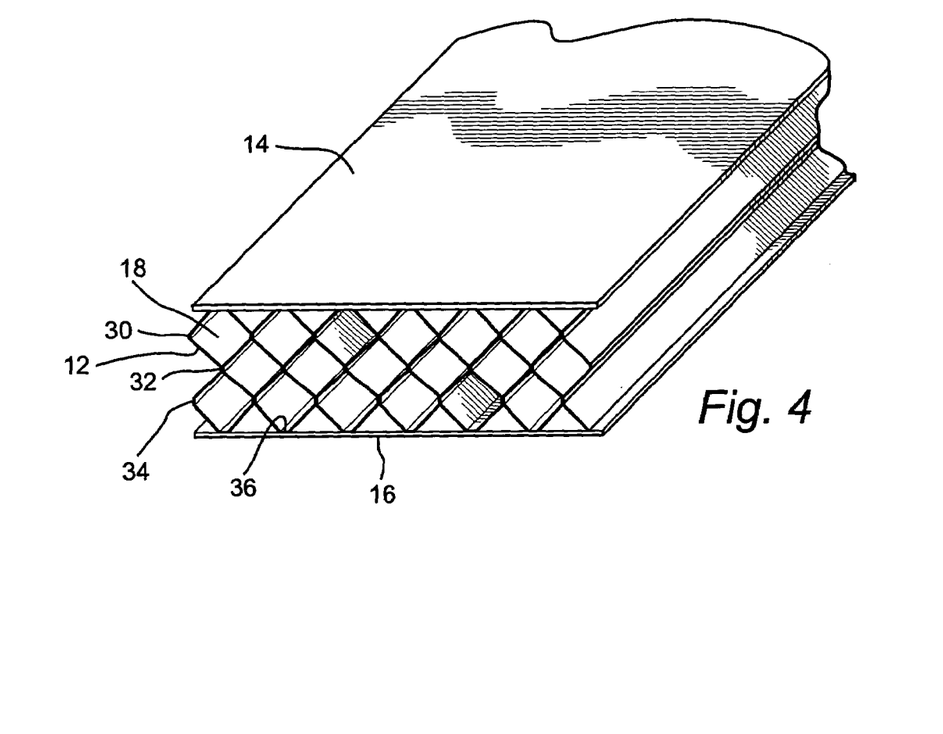
FIG. 4 is a view similar to FIG. 1 illustrating a different form the fabric seal.
Figure 5:
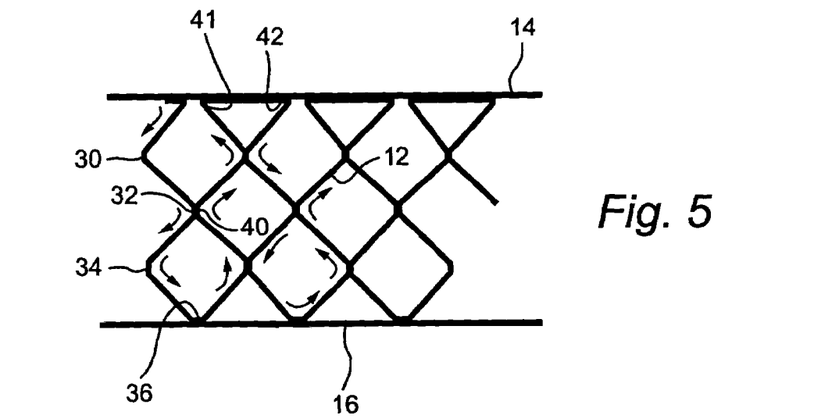
FIG. 5 is a view similar to FIG. 2 illustrating a manner of formation of the seal of FIG. 4.

In FIGS. 4 and 5, additional layers of cells for the seal are provided. That is, instead of the two layers of cells 18 illustrated in the seals of FIGS. 1–3, the seal illustrated in FIGS. 4 and 5 has three cell layers. The manner of fabrication of the seal is similar to that discussed above with respect to the seal of FIGS. 1 and 2. That is, a continuous non-woven fabric 12 is adhered to the strip 14 and extends at an angle to a first fold line 30 and then to a second fold line 32 where the material is reversely folded, and then to a third fold line 34 where a further reverse fold is provided. Each reverse fold is 90°. The non-woven fabric material then extends from fold 34 to the fabric 16 where it is folded again at 36, secured to fabric 16, e.g., by adhesive, and returned to the fabric 14 alternately being reversely folded. A reverse fold 40 is adhered to the fold 32, for example by an adhesive. The reverse fold 40, however, is folded through 135° to form an angle of about 45° with fabric 14. The material reverse folded at 40 extends along the inside surface of fabric 14 along a diagonal of the otherwise rectilinear cell 18. The non-woven fabric then, again folds along a fold line 42 through a reverse 135° angle and the folds repeat with the folds being secured to previously folded fold lines, for example, by adhesive. As in the prior embodiment, the fabric 12 is alternately reversely folded between strips 14 and 16 from one side of the seal to the opposite side, sealing the pressure regions on opposite sides of the seal from one another.

Figure 6:
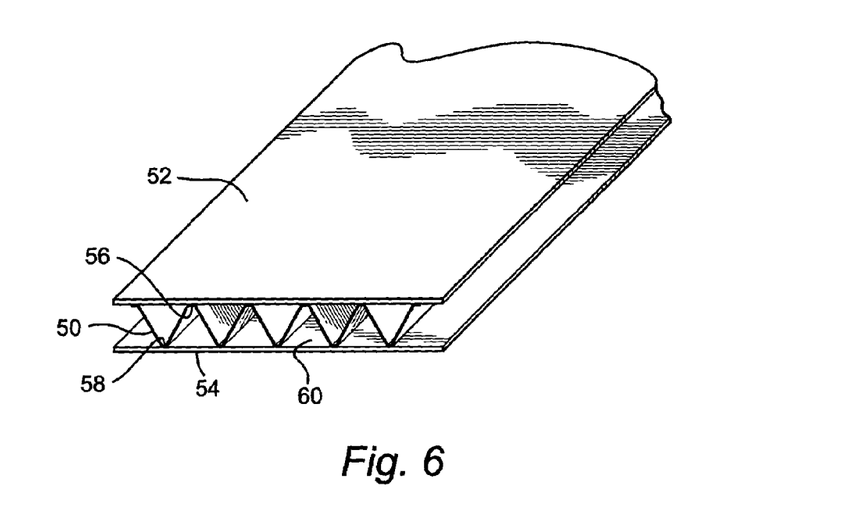
FIG. 6 is a view similar to FIG. 1 illustrating a further form of a seal.

Referring now to FIG. 6 which illustrates a further embodiment of the seal, the seal has significantly higher seal stiffness and less seal flexibility then the seals disclosed in the prior embodiment. In this form, the non-woven fabric 50 disposed between the fabric strips 52 and 54 is folded and secured to the strips along each fold line 56 and 58 thereby defining generally triangularly shaped elongated cells 60. The fold lines are preferably secured by an adhesive to the fabric strips. The resultant seal may be employed for similar gaps as in the prior embodiment but has a higher seal stiffness and less flexibility.

Figure 7:
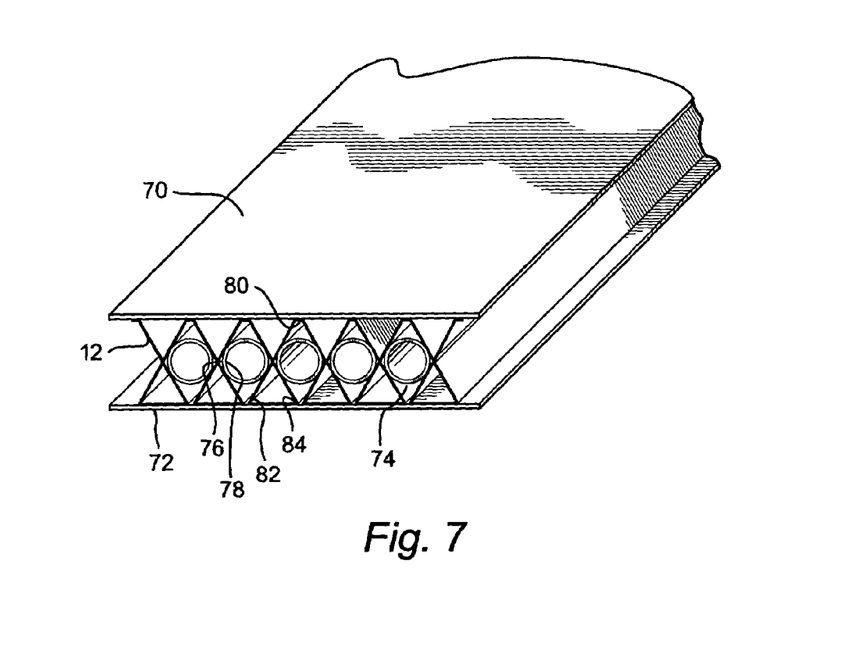
FIG. 7 is a view similar to FIG. 1 illustrating a preferred embodiment of the present invention affording a fabric seal with inserts having increased stiffness.
Figures 8, 9, 10, 11, 12, 13:
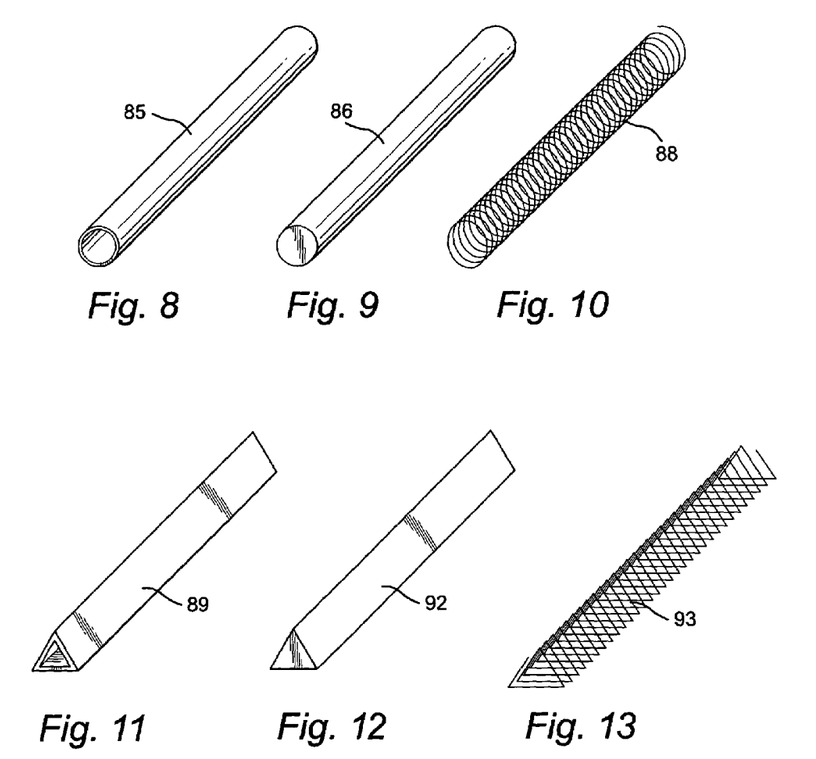
FIGS. 8–16 are perspective views of inserts for use with the seal illustrated in FIG. 7.

Referring now to FIGS. 7–10, for those seal applications requiring a high degree of stiffness, and in accordance with a preferred embodiment hereof, one or more inserts may be disposed in the cells defined by the non-woven fabric in each of the previously described embodiments. In FIG. 7, the non-woven fabric 12 extends between non-woven strips 70 and 72 similarly as illustrated in FIG. 5 but forms only a single row of rectilinear cells 74 between strips 70 and 72. The intermediate fold lines 76 and 78 are adhered to one another while the fold line 80 is adhered to strip 70 and folds lines 82 and 84 to strip 72. The generally rectilinear or rhombic-shaped cells 74 formed may receive circular elements, e.g., a rod, a tube or a coiled spring, to add stiffness to the seal. For example, in FIG. 8, a plastic pipe 85 having a thin wall thickness may be disposed in one or more of the cells 74. Alternatively, as illustrated in FIG. 9, a flexible rubber or aerated plastic rod 86 may be disposed in one or more of the cells 74. An additional form of insert is illustrated in FIG. 10 comprising a helical wire coil 88 which likewise may be disposed in the cells. The inserts significantly increase the stiffness of the seal while reducing seal flexibility and therefore afford a seal of this type useful for sealing between higher pressure differentials.

Alternatively, the inserts can be made with different materials and have different forms for use with variously shaped cells of the seal illustrated in FIGS. 1–7 and 17–19. For example, the inserts may have a generally triangular-shaped tubular cross-section as illustrated by insert 89 in FIG. 11, a solid triangular-shaped cross-section illustrated by insert 92 in FIG. 12 or a triangular cross-section formed by a coiled spring insert 93 illustrated in FIG. 13. Thus, with respect to FIG. 17, the seal may include any one of the triangularly-shaped inserts of FIGS. 11–13, respectively, or may comprise a combination of two or more of the three different types of inserts illustrated in FIGS. 11–13. It will be appreciated that in the seal of FIG. 17 (similar to that of FIG. 6), the preferred non-woven fabric is adhered to the strips 14 and 16, preferably by adhesive, forming triangularly-shaped cells which receive the triangularly-shaped inserts. Further, the inserts of FIG. 17 may comprise two or more of the different types of inserts illustrated in FIGS. 11–13, e.g., alternating inserts 89, 92 or 92, 93 or 89, 93 or in various other combinations in adjacent cells.

Figures 14, 15, 16:
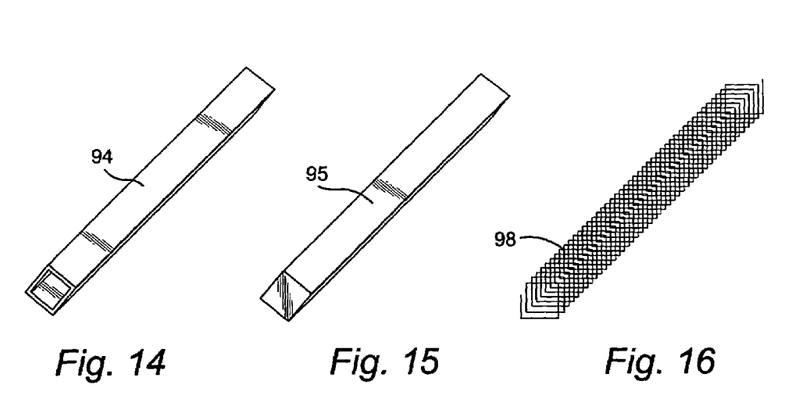
Figure 17:
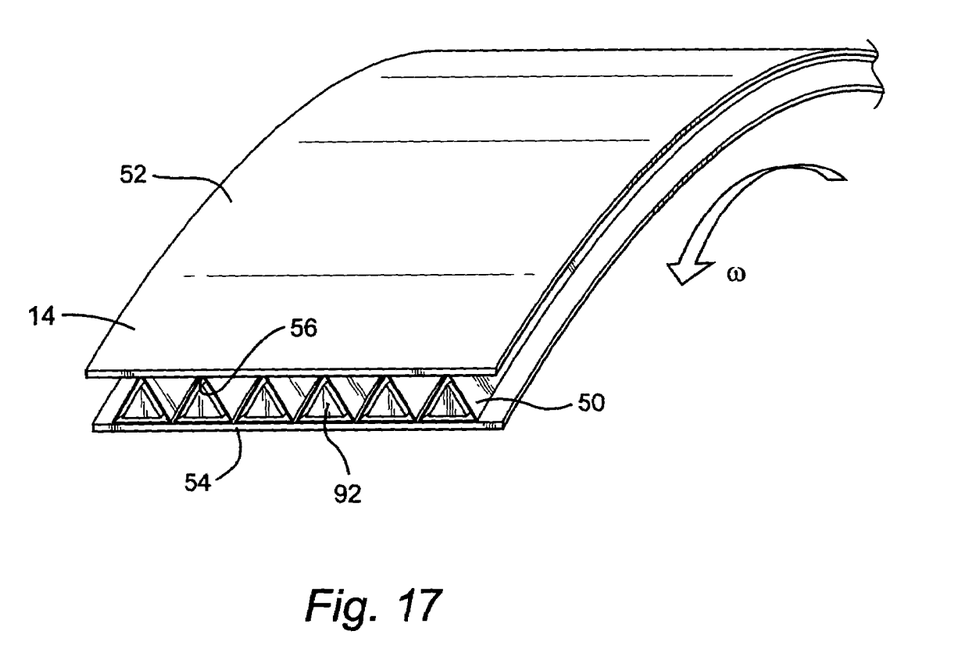
FIG. 17 is a perspective view of triangularly-shaped inserts located in triangularly-shaped cells of the fabric seal for increasing stiffness.

Further, as illustrated in FIGS. 14–16, the inserts may have a rhombic configuration which may take a number of different forms of inserts. For example, FIG. 14 illustrates an insert 94 formed of a tube having a rhombic cross-section. FIG. 15 illustrates an insert 96 in the form of a solid plastic rod having a rhombic cross-section. FIG. 16 illustrates an insert 98 in the form of a coiled wire having a rhombic cross-sectional configuration. Thus, the inserts of FIGS. 14–16 may be used as inserts for the seals illustrated in FIGS. 1–5, 7, 18 and 19.

Figure 18:
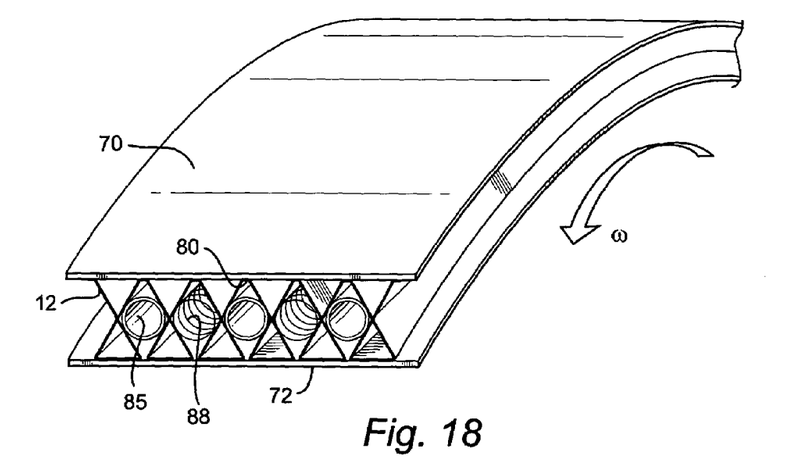
FIG. 18 is a perspective view illustrating a combination of insert types in the cells of the fabric seal.

It will also be appreciated that the inserts of each type may be used in a single seal. For example, as illustrated in FIG. 18 (a seal similar to the seal of FIG. 7), inserts 85 and 88 (FIGS. 8 and 10, respectively) are alternatively disposed in the adjacent cells. It will be appreciated that the solid inserts 86 of FIG. 9 could likewise be applied in the seal of FIG. 18 whereby the inserts may comprise two or more of the different types of the circular inserts illustrated in FIGS. 8–10.

Figure 19:
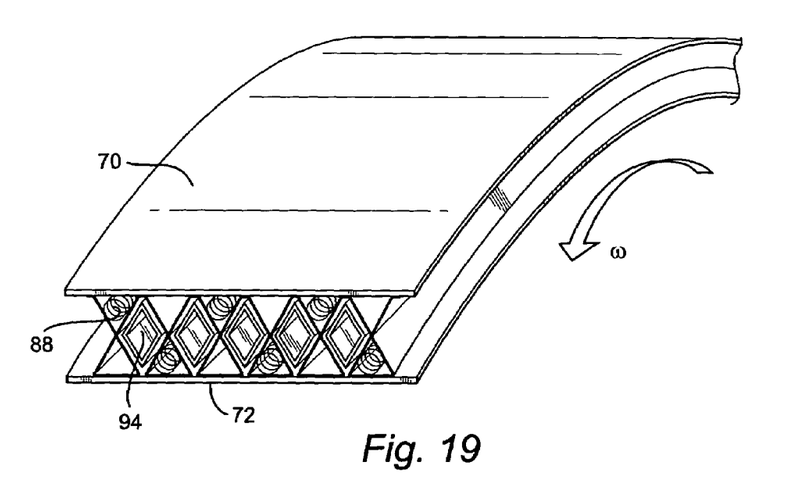
FIG. 19 is a perspective view similar to the FIG. 18 illustrating an alternate arrangement of different types of inserts in the cells.

Referring now to FIG. 19, the seal (similar to the seal of FIG. 7) includes inserts of the different cross-sectional configurations. In the illustrated form of seal, the rhombic and circular inserts 94 and 88, respectively, are utilized. While the rhombic tubular and circular coil spring inserts 94 and 88 are illustrated, it will be appreciated that the rhombic solid or coil spring of FIGS. 15 and 16, respectively, may be used in conjunction with solid circular or coil spring inserts as illustrated in FIGS. 9 and 10, respectively. It will also be appreciated that different forms of the rhombic and circular cross-section inserts may be utilized in conjunction with one another.

Also, the cellular form of the intermediate fabric provides a bias toward the strips, i.e., the fabric tends to separate the strips one from the other. To enhance that bias, the fabric may be formed of a combination of metallic fibers and non-metallic fibers, the proportions being dependent upon the application of the seal. For example, in a hydrogen atmosphere in a cooling system for an electrical generator, non-metallic fibers are used to avoid sparking.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal between a first stationary component and second rotating components comprising:

first and second non-woven fabric layers spaced from one another with a first layer thereof for securement to the first stationary component and a second layer thereof disposed adjacent the second rotating component;

a third non-woven fabric secured to and between said first and second layers, said third non-woven fabric defining a plurality of cells between said first and second layers having major length dimensions extending in directions generally coextensive with said layers of the seal, said third non-woven fabric biasing said second layer in a direction towards said second component; and inserts extending within a plurality of said cells to provide stiffness to said seal; said third non-woven fabric extending continuously from one side of the seal to an opposite side of the seal with the cells being spaced from one another.

2. A seal according to claim 1, wherein said third non-woven fabric forms elongated cells having elongated multiple sides between said layers.

3. A seal according to claim 2, wherein said third non-woven fabric is secured to itself at spaced locations along said cells and to said layers to define said cells.

4. A seal according to claim 2, wherein said third non-woven fabric is formed in part of metal fibers.

5. A seal according to claim 1 wherein said first and second layers extend generally parallel to one another, a major length dimension of said inserts extending in a direction generally parallel to said first and second layers.

6. A seal according to claim 1 wherein said inserts have at least one of a circular, triangular or rhombic cross-sectional shape.

7. A seal according to claim 6 wherein another of said inserts has a different cross-sectional shape than said one insert.

8. A seal according to claim 6 wherein said inserts are formed of at least one of a tube, solid rod or a coiled spring.

9. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said third fabric biasing said second layer in a direction towards said second component; and inserts extending within a plurality of said cells to provide stiffness to said seal, the first and second components being stationary and rotatable components, respectively, said first and second layers, said cells and said inserts being disposed generally concentrically about an axis of rotation of the rotatable component.

10. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said third fabric biasing said second layer in a direction towards said second component; and inserts extending within a plurality of said cells to provide stiffness to said seal, said inserts including hollow thin walled plastic tubes.

11. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said third fabric biasing said second layer in a direction towards said second component; and inserts extending within a plurality of said cells to provide stiffness to said seal, said inserts comprising wire coils.

12. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said third fabric biasing said second layer in a direction towards said second component; and inserts extending within a plurality of said cells to provide stiffness to said seal, said inserts comprising solid plastic tubes.

13. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said fabric cells having elongated multiple sides between said layers; and inserts extending within a plurality of said cells to provide stiffness to said seal, said inserts being substantially coextensive in length with the length of said cells, the first and second components being stationary and rotatable components, respectively, said first and second layers, said cells and said inserts being disposed generally concentrically about an axis of rotation of the rotatable component.

14. A seal between first and second spaced components comprising:

first and second fabric layers spaced from one another with a first layer thereof for securement to the first component and a second layer thereof disposed adjacent the second component;

a third fabric secured to and between said first and second layers, said third fabric defining a plurality of cells between said first and second layers having major length dimensions extending in directions generally coextensive with said layers of the seal, said fabric cells having elongated multiple sides between said layers; and inserts extending within a plurality of said cells to provide stiffness to said seal, said inserts being substantially coextensive in length with the length of said cells, said inserts including one of hollow thin walled tubes, wire coils or solid tubes.

15. A seal according to claim 14 wherein said inserts have at least one of a circular, triangular or rhombic cross-sectional shape.

16. A seal according to claim 15 wherein another of said inserts has a different cross-sectional shape than said one insert.

* * * * *

UNITED STATES PATENT AND TRADEMARK OFFICE
CERTIFICATE OF CORRECTION

PATENT NO. : 7,115,317 B2 Page 1 of 1
APPLICATION NO. : 10/677339
DATED : October 3, 2006
INVENTOR(S) : Zhuo et al.

It is certified that error appears in the above-identified patent and that said Letters Patent is hereby corrected as shown below:

Column 3, line 43, delete "FIGS. 12" and insert --FIGS. 1 and 2--.

Signed and Sealed this

Nineteenth Day of December, 2006

JON W. DUDAS
*Director of the United States Patent and Trademark Office*